(12) United States Patent
Hogan

(10) Patent No.: US 8,429,618 B2
(45) Date of Patent: Apr. 23, 2013

(54) PARAMETRIC REGULAR OBJECT TYPES WITH COMPREHENSIONS FOR AUTOMATED GENERATION OF SOFTWARE TEST FIXTURES

(75) Inventor: Michael Hogan, Schwenksville, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 1055 days.

(21) Appl. No.: 12/233,250

(22) Filed: Sep. 18, 2008

(65) Prior Publication Data

US 2009/0077533 A1 Mar. 19, 2009

Related U.S. Application Data

(60) Provisional application No. 60/973,567, filed on Sep. 19, 2007.

(51) Int. Cl.
G06F 9/44 (2006.01)

(52) U.S. Cl.
USPC ............ 717/126; 717/124; 717/127; 717/131

(58) Field of Classification Search ......................... None
See application file for complete search history.

(56) References Cited

U.S. PATENT DOCUMENTS

2008/0209391 A1* 8/2008 Iborra et al. .................. 717/105

OTHER PUBLICATIONS

Meszaros. Published by Addison-Wesley, New York, May 21, 2007 (pp. 26; 59-65; 298-300); Magazine.
Javed, et al. Published in Automation of Software Test. Second International Workshop, May 2007 (pp. 1-7); Magazine.
Ramkarthik, et al. Published in 5th IEEE/ACIS International Conference on Computer Information Science, Jul. 2009 (pp. 1-6); Magazine.
Prasanna, et al. Published in Academic Open Internet Journal, vol. 15, 2005 (pp. 1-7). Retrieved from the internet: URL:http://www.acadjournal.com/2005/v15/part6/p4/; Magazine.
Ramkarthik et al., "Generating Java Skeletal Code With Design Contracts from Specification in a Subset of Object Z", 5th IEEE/ACIS International Conference on Computer Information Science, Jul. 2006, pp. 1-6, XP002532159.
International Search Report dated Jul. 6, 2009 for PCT application PCT/US2008/010876.

* cited by examiner

*Primary Examiner* — Chuck Kendall

(57) ABSTRACT

A system and method for creating abstract descriptions of general applications includes creating a library of code primitives and expressing skeletal code structures in terms of parametric regular tree types including parameterized declarations of the code primitives. Parametric values are generated using set comprehensions. The set comprehensions are applied to the skeletal code structures to generate a working application such that a parametric, regular object type system is combined with a comprehension syntax for creating abstract descriptions of a general application.

17 Claims, 10 Drawing Sheets

```
// The OPCGroup class allows one to to declare an OPCGroup.
// The OPCGroup represents a group of OPCItems and each OPCServer needs one or more OPCGroups
// if it is to exchange data with a given OPCServer.
function OPCGroup(){
    // make a variable to hold a reference to the OPCGroup that we represent
    this.vbsOPCGroup = null;
    // Make a "server" input and initialize it to null
    // it will become non-null when we are wired to a server
    this.server = new Sink();
    this.server.set(null);
    // make a "me" output that will be connected to OPCItem blocks
    // in order to allow them access to my AddItem function
    this.me = new Source();
    this.me.setVal(this);
    // Make a function that allows OPCItems to add themselves to this group
    this.addItem = function (itemName) {
        if(this.vbsOPCGroup ){
            var newItem = this.vbsOPCGroup.AddItem(itemName);
            return newItem;
        }
    }
    // make an invoke function
    this.invoke = function(){
        var server = this.server.get();
        var vbsOPCGroup = this.vbsOPCGroup;
        if((server != null) && (vbsOPCGroup == null)){
            this.vbsOPCGroup = server.AddGroup();
            vbsOPCGroup = this.vbsOPCGroup;
        }
    }
}
```

Fig. 2

```
// The testOPCBlocks function is a simple demo that uses the OPC interface objects
// to build a closed-loop simulation. The simulation reads "amplitude", "bias" and
// "period" signals from the OPC server using OPCItem objects. These values are used
// to control the amplitude, bias and period of a sawtooth waveform that is calculated
// using a "sawtoothWave" object. The resulting waveform values are then written out
// to the OPC server using an OPCItem object.
function testOPCBlocks(){
    // --- Make an OPCServer, and OPCGroup and an OPCItem
    opcServer = new OPCServer();
    opcGroup = new OPCGroup();
    opcAmplitude = new OPCItem();
    opcBias = new OPCItem();
    opcPeriod = new OPCItem();
    opcSawtooth = new OPCItem();
    sawtooth = new sawtoothWave();

// --- Set initial values needed to set up OPC bindings
    opcServer.progID.set('Matrikon.OPC.Simulation');
    opcAmplitude.itemID.set('Simulation.Amplitude');
    opcBias.itemID.set('Simulation.Bias');
    opcPeriod.itemID.set('Simulation.Period');
    opcSawtooth.itemID.set('Simulation.Sawtooth');

// --- Wire up the connections between all of the OPC blocks
    opcGroup.server.bind(opcServer.me);
    opcAmplitude.group.bind(opcGroup.me);
    opcBias.group.bind(opcGroup.me);
    opcPeriod.group.bind(opcGroup.me);
    opcSawtooth.group.bind(opcGroup.me);

// --- Wire the sawtooth signal generator into the simulation
    sawtooth.amplitude.bind(opcAmplitude.out);
    sawtooth.bias.bind(opcBias.out);
    sawtooth.period.bind(opcPeriod.out);
    opcSawtooth.input.bind(sawtooth.out);
}
```

Fig.4

```xml
<?xml version="1.0" encoding="utf-8" ?>
<SimulationDefinition>

<!-- Make OPCServer block -->
<block name="opcServer" type="OPCServer" >
    <assign item="opcServer.progID" value="'Matrikon.OPC.Simulation'" />
</block>

<!-- Make OPCGroup block and bind to OPCServer block -->
<block name="opcGroup" type="OPCGroup" >
    <connect sink=".server" source="opcServer.me" />
</block>

<!-- Make OPC and bind to items in the simulator by connecting them through the OPCGroup. -->
<block name="opcAmplitude" type="OPCItem" >
    <assign item=".itemID" value="'Simulation.Amplitude'" />
    <connect sink=".group" source="opcGroup.me" />
</block>
<block name="opcBias" type="OPCItem" >
    <assign item=".itemID" value="'Simulation.Bias'" />
    <connect sink=".group" source="opcGroup.me" />
</block>
<block name="opcPeriod" type="OPCItem" >
    <assign item=".itemID" value="'Simulation.Period'" />
    <connect sink=".group" source="opcGroup.me" />
</block>

<!-- Create a Sawtooth block and wire it up -->
<block name="sawtooth" type="sawtoothWave" >
    <connect sink=".amplitude" source="opcAmplitude.out" />
    <connect sink=".bias" source="opcAmplitude.out" />
    <connect sink=".period" source="opcAmplitude.out" />
    <connect sink="opcSawtooth.input" source=".out" />
</block>

</SimulationDefinition>
```

Fig. 5

```xml
<SimulationComponent name="DiscreteSignal_and_Alarms">

<!-- These params provide default names for the mapping points -->
<parameter name="pv"     set="pv"/>
<parameter name="alarm"  set="alarm"/>

<!--
The 'dutyCycles', 'Limits' parameters and provide default definitions for the two "for" loops that generate instances of this componen
The signal types generated and threshold of the comparators can be altered by overriding these default values.
-->

<parameter name="dutyCycles" set="sequence('25 to 75 by 25')"/>
<parameter name="Limits"     set="[('disc_out','almHigh'],['not_disc_out','almLow']]"/>

<!-- vary dutyCycle over the prescribed range (by default, from 25% to 75% in steps of 25% -->
<for name="dutyCycle" set="$dutyCycles$" >

<!-- Alternate between the two prescribed limits (limit high and limit low) -->
<for name="Limit" set="$Limits$">

<!-- almSignalName picks off the name of the signal that will drive the alarm and
     effectively binds to "disc_out" on the first pass and "not_disc_out" on the 2nd pass etc. -->
<for name="almSignalName" set="$Limit$[0]" >

<!-- almName gives a sensible name for the alarm condition ("almHigh" on the first pass and "almLow" on the 2nd etc.) -->
<for name="almName" set="$Limit$[1]" >

<!-- blockName builds up a name for the internal blocks, based on the value of $almName$ and $dutyCycle$ -->
<for name="blockName" set="square_$almName$_$dutyCycle$pct'" >

<!-- Declare a wave generator block for each analog signal -->
<block name="$blockName$" type="squareWave" >
  <connect sink=".amplitude" source="opcAmplitude.out" />
  <connect sink=".bias"      source="opcBias.out" />
  <connect sink=".period"    source="opcPeriod.out" />
  <assign  item=".dutyCycle" value="$dutyCycle$/100.0"/>
</block>

<!-- Generate mapping constructs for the by the "pv" and "alarm" parameters as mapping points -->
<for name="OPCFanoutName" set="$blockName$_$mappingPoint$_OPC'">
<block name="$OPCFanoutName$" type="OPCFanOut">
  <connect sink=".server"  source="opcServer.me" />
  <connect sink=".signal"  source="$blockName$.out" />
</block>

<map from="$OPCFanoutName$" to="$mappingPoint$">
  <block name="$to$" type="OPC_map_block">
    <assign item=".itemID" value="'$to$'.$alarm$'" />
    <connect source="$from$.me" sink=".OPCFanOut" />
  </block>
</map></for></for></for></for></for>

</SimulationComponent>
```

Fig.7

US 8,429,618 B2

PARAMETRIC REGULAR OBJECT TYPES WITH COMPREHENSIONS FOR AUTOMATED GENERATION OF SOFTWARE TEST FIXTURES

RELATED APPLICATION INFORMATION

This application claims priority to provisional application Ser. No. 60/973,567 filed on Sep. 19, 2007, incorporated herein by reference.

BACKGROUND

1. Technical Field

This disclosure relates to automated software generation, and more particularly, to a system and method for automated software test fixture generation for testing software programs.

2. Description of the Related Art

In modern software development, there are a number of economically driven trends that are changing the way in which software is created. For example, companies that produce software-based products often have "software product lines", which are families of software that share some overarching commonalities. These commonalities may occur at a binary level, a source-code level or they may be somewhat more nebulous (e.g., corporate "know-how"). Another emerging trend in software production is that of agile programming, where products are created iteratively, and each successive iteration adds small increments of functionality and resolves problems found in prior iterations. The two practices are in no way exclusive, and many companies use both the "product line" and "agile" concepts to some degree.

Although trends such as software product lines and agile programming can greatly improve programmer productivity in certain settings, they can also cause problems in downstream portions of the software production process. In particular, they can cause bottle-necks in software testing departments.

For example, consider the practice of iterative programming, which boosts programmer productivity by allowing programmers to successively build on "infrastructure" created in earlier iterations. Unfortunately, iterative programming often reduces the productivity of software testing, since recurring bits of "infrastructure" may change from iteration to iteration and must therefore be tested over and over. In fact, if the testing process is naïve, merely doubling the number of iterations used to produce a piece of software of a given level of complexity can double the work involved in testing. This increase in cost is merely a product of the number of iterations, and the increased expenses do not per se yield benefits in the form of increased software functionality or quality.

Software product lines enhance programmer productivity by promoting code reuse across products. For example, code reuse permits the creation of, say, eight applications with the same effort that it would have taken to write four "no-code-shared" applications, i.e., it has doubled programmer productivity. Unfortunately, this productivity benefit seldom gets passed on to the testing process, as it is difficult or impossible to analytically factor out the eight applications into "four applications worth of testing". In most cases, the applications are tested as if they were essentially unrelated. The productivity dilemmas introduced by iterative development and those introduced by software product lines are effectively the same. In both cases, there is commonality in structure, but we are unable to analytically determine "what must be tested" and are therefore unable to exploit structural themes in order to reduce testing effort. In the case of iterative programming, the "axis of commonality" is temporal, i.e., iteration N has much in common with iteration N+1. In the case of software product lines, the axis of commonality is across the ensemble of products. Many software companies combine the practices of "iterative development" and "software product lines" to some extent, so their test departments face productivity stress from both the "temporal" and "ensemble" axes.

SUMMARY OF THE INVENTION

There are essentially two ways to deal with these "production versus testing" productivity issues. One approach is to use some analytical means to reduce the amount of testing required. If it is possible to reduce testing effort to the degree that we are reducing programming effort, then the testing process can always keep pace.

Another possibility is to make testing highly automated, so that testing labor is not an issue. The present principles are, in some ways, a hybrid that employs these two approaches together. The present embodiments address the "common but invisible" structure issue by providing a way to incrementally build reusable testing components, and address the raw productivity issue by providing an abstract type system that permits components to be rapidly assembled in some principled way to automatically create test fixtures.

Test automation is an area that tends to get very mixed results. In environments where the features of software products change slowly over time, or where product families have a very high degree of functional similarity across the product line, it is relatively easy to devise automatic tests. However, when products change relatively quickly, when products have "conceptual" similarities which differ in important details, or when product line commonalities are fine-grained (e.g., product A shares 20% of code with product B, and product C shares a different 20% of code with product A and also shares some code with B that is entirely absent from A, etc.) traditional automated testing techniques tend to suffer from many problems. In fact, in many cases, investments to automate testing using traditional test scripts can cost more than manual testing.

Note that Automated Testing refers to using software to test software. Automated tests may still require human intervention to monitor stages for analysis or errors.

The underlying techniques in accordance with the present invention, specifically the use of regular object types with comprehensions for generative programming, are particularly well-suited to capturing both the incremental changes in structure (per iterative development or code reuse) and the parametric variations in structure that commonly occur when products have similar functionality (e.g., applications share "know how", but do not necessarily share code). The "shared know how but no shared code" case often arises, e.g., when technology companies acquire other companies that are in a related field or when a testing lab must test products for a number of manufactures that offer similar devices or systems.

A system and method for creating abstract descriptions of general applications includes creating a library of code primitives and expressing skeletal code structures in terms of parametric regular tree types including parameterized declarations of the code primitives. Parametric values are generated using set comprehensions. The set comprehensions are applied to the skeletal code structures to generate a working application such that a parametric, regular object type system is combined with a comprehension syntax for creating abstract descriptions of a general application.

A system for creating abstract descriptions of general applications includes a library of code primitives, skeletal code structures expressed in terms of parametric regular tree types including parameterized declarations of the code primitives, and a processor configured to generate parametric values using set comprehensions and apply the set comprehensions to the skeletal code structures to generate a working application such that a parametric, regular object type system is combined with a comprehension syntax for creating abstract descriptions of a general application.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 2 shows program code for an illustrative example of function block code;

FIG. 4 shows program code used to configure the logic shown in FIG. 3;

FIG. 5 shows program code in XML for specifying the simulation logic defined in FIG. 4;

FIG. 7 shows program code for an illustrative example of Simulation Component set generation syntax code in accordance with an illustrative embodiment;

DETAILED DESCRIPTION OF PREFERRED EMBODIMENTS

Figure 1:
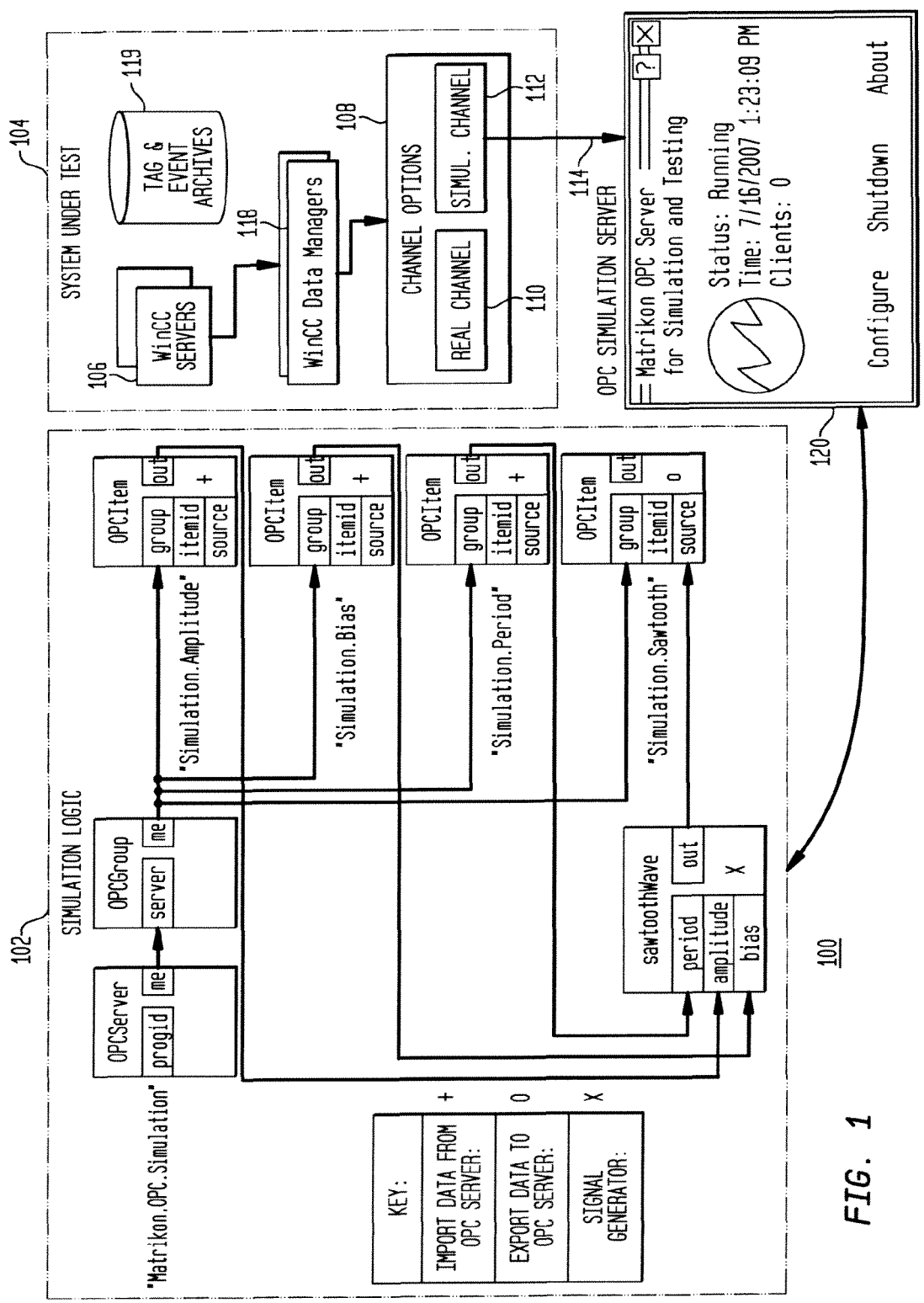
FIG. 1 is a block diagram showing a simulation logic module for simulating a system under test in accordance with one embodiment.

The present invention employs a parameterized, regular object type system and set comprehensions as a basis for a generative programming system which generates test fixtures for software systems that share common characteristics. In the case of iterative development, the shared characteristics are those elements of functionality that are retained from one iteration to the next. In the case of software product lines, the shared characteristics are functional commonalities across the product line. These "functional commonalities across the product line" may or may not arise from a common code basis.

In the present context, a "comprehension" is a set of values that are generated as a result of interpreting a formal description of a set. The comprehensions generate sets that may include lists (e.g., "list comprehensions").

An underlying assumption in the present principles is that common structure arises from common requirements. In the case of iterative development, the common requirements are the product requirements, which need to be relatively stable if iterative development is worthwhile. This "relative stability of requirements" is an advantage for the present invention, since it helps to ensure that test abstractions are similarly stable. Abstraction is a method of simplifying the task of reasoning by eliminating details via strategies such as substituting concepts for specific instances, gathering common properties of objects into conceptual attributes, etc.

For product families, the common requirements are usually domain requirements of the family (e.g., the products in a product line generally do similar things, more-or-less by definition). Common requirements are a potentially important concept from the standpoint that they can be used as an aid in test fixture design. In many cases, this "requirements to test fixture design" process can be automated (so called "Model Based Testing"), and the present invention, by design, has features that assist in this regard. The present invention does not strictly depend on an underlying assumption of "common requirements"—rather, it is open and "friendly" to requirements-driven automatic testing.

The present invention uses parametric types in at least two ways. A first way that it uses parametric typing is to permit for abstractions of variation in the test fixture. These abstracted variations are then made concrete by applying set comprehensions that parameterize items to be instantiated as part of the test fixture, with the result being a test fixture that has rich, repeatable behavior and a structural basis that can be formally analyzed. The other use of parametric typing is in the mapping of the test fixture to test-points in the system under test. Again, by applying these parametric bindings to set comprehensions, we can automatically bind a given abstract test fixture to a variety of different devices.

For test fixtures to be useful, a test fixture should exercise the System Under Test (SUT) in some meaningful way, and in general, the more varied the exercise, the more thorough the test. In addition, test fixtures need a degree of repeatability, so that any conditions which expose problems can be replicated (e.g., for regression testing, confirmation that discovered problems are genuine, etc.). In fact, a shortcoming of manual testing is the limited repeatability that human testers can achieve, and their ability to achieve reproducible results generally varies as the inverse of test complexity.

A further disadvantage of manual testing is that it is often difficult or impossible to formally describe the reasoning behind the test, which makes it difficult to make provable claims about test validity, traceability to requirements, etc. Automatic test fixtures, on the other hand, are generally able to reproduce test scenarios accurately without regard to their complexity, and the abstract descriptions of the present invention are well-suited to automatic reasoning about test validity, traceability, etc.

The functions of the various elements shown in the figure can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In the present disclosure, an automated alarm testing system will be described to illustrate embodiments in accordance with the present principles. The automated alarm system is intended as a rigorous, automated acceptance test for alarm functions in a process control system operator station. In particular, this automated alarm test system can be used to test various products, e.g., in the PCS 7 OS migration product line.

PCS 7 is a process control system produced by Siemens AG and will be employed to illustrate the present principles. PCS 7/OS is the portion of the PCS 7 product line that is devoted to allowing operators to monitor and control their process. The product includes a software framework that is layered on the WinCC product and which adapts WinCC for use in continuous process control applications. WinCC is a general process visualization package (operator station (OS)) produced by Siemens AG. Continuous Process Control is a process whose physical system is represented primarily though variables that are smooth and uninterrupted in time. The control of the water temperature in a heating jacket is an example of continuous process control. A Hybrid Process Control System includes applications having elements of discrete, batch and continuous process control.

An Operator Station (OS) is a system that allows one to monitor and interact with a process control system. Most modern operator stations are highly visual applications that provide operators with rich visual cues about a process's operation, rich navigation models that allow one to view different portions of a process in different contexts and modern interaction mechanisms (e.g., mouse-clicks) for interacting with the control of the process.

A Process Control System is a system which controls a process. In the present context, a process control system generally denotes a continuous process control system or a hybrid process control system. Ideally, a system in accordance with the present principles should be able to fully automate the generation, execution and analysis of commonly recurring test themes for all PCS 7 OS migration products. A Distributed Control System (DCS) includes a manufacturing system or process control system in which the controller elements are distributed throughout the system with each component sub-system controlled by one or more controllers. The entire system is generally networked for communication and monitoring. The present principles are applicable to single location and distributed control systems.

Automatic Generation of Test Fixtures: One of the most basic concepts in testing is that of a test fixture. A test fixture is essentially an interface between test instrumentation and software under test (SUT). A test fixture is effectively a controlled environment which is used to exercise the system under test to perform active testing on the system software. A test fixture includes the things needed to be in place to run a test and determine whether outcomes are "as expected". This may also be called a test context or a test environment. An alarm may be a special process control event that is issued to indicate a problem in a process. However, an alarm may also be a synonym for a "process control event". We use the term "alarm" in the more general sense. An event is used as shorthand for a process control event, i.e., a message that is issued by some entity in a control system and which is intended to be received in the operation stations.

Automatic Analysis of Results: The present system automatically analyzes the results of a particular test scenario and reports them. These results will preferably be in summary form (pass/fail) and should also provide a means to "drill down" and learn any detailed information on faults that may be helpful in repairing them.

Self Contained: The present system is preferably independent of underlying control system hardware. This is an advantage for several reasons. Most of the control systems that are targets of the PCS 7/OS migration products are antiquated, physically large and expensive. As a result, they are often difficult to acquire, store and maintain. An additional benefit is that the independence from underlying hardware eliminates the need to configure various antiquated control systems, which in turn eliminates much of the learning curve involved in teaching testers the details of these antiquated systems.

The present embodiments may include a self-contained cluster of one or more process visualization packages (e.g., four PCs (an engineering station, two WinCC servers and one WinCC client, other process visualization packages may also be employed). The bulk of the automated alarm testing involves accepting delivery of a release of one of the OS migration products, installing a release on the alarm testing cluster, performing some brief set-up of the system, initiating the automatic test sequence and evaluating the results.

The current practice of testing OS migration products on real control systems needs a significant investment in learning the details of the target system. Since the present system is independent of "real" control systems, it is free of the "system specific details" that surround real control systems. As a result, the investment in learning how to use the automated test bed becomes a one-time cost. Further, since the automated test bed has a very specific purpose, it is relatively simple and therefore easy to learn, which makes the one-time learning cost relatively modest.

The components that comprise the alarm testing system are preferably designed with an eye towards reuse in other contexts. For example, the tools that are used to correlate alarm logs between redundant servers can be used outside the context of fully automated testing to perform interactive server-to-server event analysis.

Referring now to the drawings in which like numerals represent the same or similar elements and initially to FIG. 1, architecture 100 for the alarm testing system is illustratively depicted where simulation logic 102 is stimulating a system under test (SUT) 104. In configuring test fixtures, alarming or simulation logic 102 for some OS migration products can be effectively exercised by merely providing signals which are loose emulations of the alarm signals that real controllers would issue. These relaxed requirements arise from the fact that migration products are designed to be "target neutral" to the extent possible. In most cases, the migration products are designed with very modest expectations about the ability of the underlying channel to interact with an operator station (e.g., WinCC) and the bulk of an interaction model between WinCC and migrated controllers is managed by a Runtime Framework 106. Two fortunate side-effects of this are that it simplifies the task of mimicking a target control system and also simplifies the task of analyzing alarm test results.

An additional benefit of the "target neutral" architecture is that the details of an actual channel which is used to present signals to WinCC are mostly irrelevant. As long as WinCC "sees" appropriate signal values, corresponding elements in the OS Migration Product Framework (e.g. the EventState-Calculator) will respond accordingly. Some OS migration products use special channels to manage WinCC to controller interaction. Such migration products may be difficult to simulate and may therefore have certain limitations regarding their "testability" under the proposed system.

A channel option interface 108 may employed real channels 110 or simulated channels 112. To make the test platform self-contained, simple and inexpensive, object linking and embedding for process control (OPC) channels 114 are employed to bring signals into WinCC which includes WinCC servers 116 and WinCC data managers 118. Tags are single pieces of data that are available from a process control system. These tags may be hosted using a Matrikon™ OPC Simulation Server or other OPC server 120. The OPC simulation server is a free, configurable, easily installed OPC server that makes it simple to simulate process dynamics and alarm signals by creating a simulation application that can read and write appropriate points in the OPC server 120.

The choice of an OPC channel 114 and the OPC simulator 120 as a signal provider may be changed and is relatively easy to substitute other channel types and/or signal providers if the need arises. Interaction between the simulator 102 and the OPC server 120 is bidirectional. This permits WinCC screens to be used to control the simulation. For example, some of existing test scenarios require that testers manipulate the amplitude, period and bias of process signals to exercise alarms in the system under test 104. Since the simulator 102 is able to read these signals and respond to the signals exactly as a real controller would, these test scenarios will work exactly as originally intended, despite the fact that we have substituted the simulator 102 for any real controllers. In this way, some of the more important investments that we have made in test fixture design to date are preserved. Tags and other information are stored in an archive or database 119.

Simulation Logic Overview: The simulation logic 102 is built up from small function-block-like components that may be written in JavaScript™. JavaScript™ was selected for this example because it is readily available; it allows new components to be created with relative ease; and it has unique characteristics (higher order functions, "eval" statement etc.) that simplify the job of knitting components together to quickly build simulation logic.

Referring to FIG. 2, a sample source code 130 for a simulation "function block" that represents an OPCGroup is illustratively depicted. In this specific example, the OPCGroup is configured by wiring its "server:" input to the "me" output of an OPCServer block. The "me" output of the OPCGroup block is then wired to a number of OPCItem blocks. Once wired in this way, the OPCItem blocks can transfer any values presented to their "source" inputs to an OPC server via OPC Write calls and they can read from the OPC server and make the value of their associated tag available at their "out" output.

Figure 3:
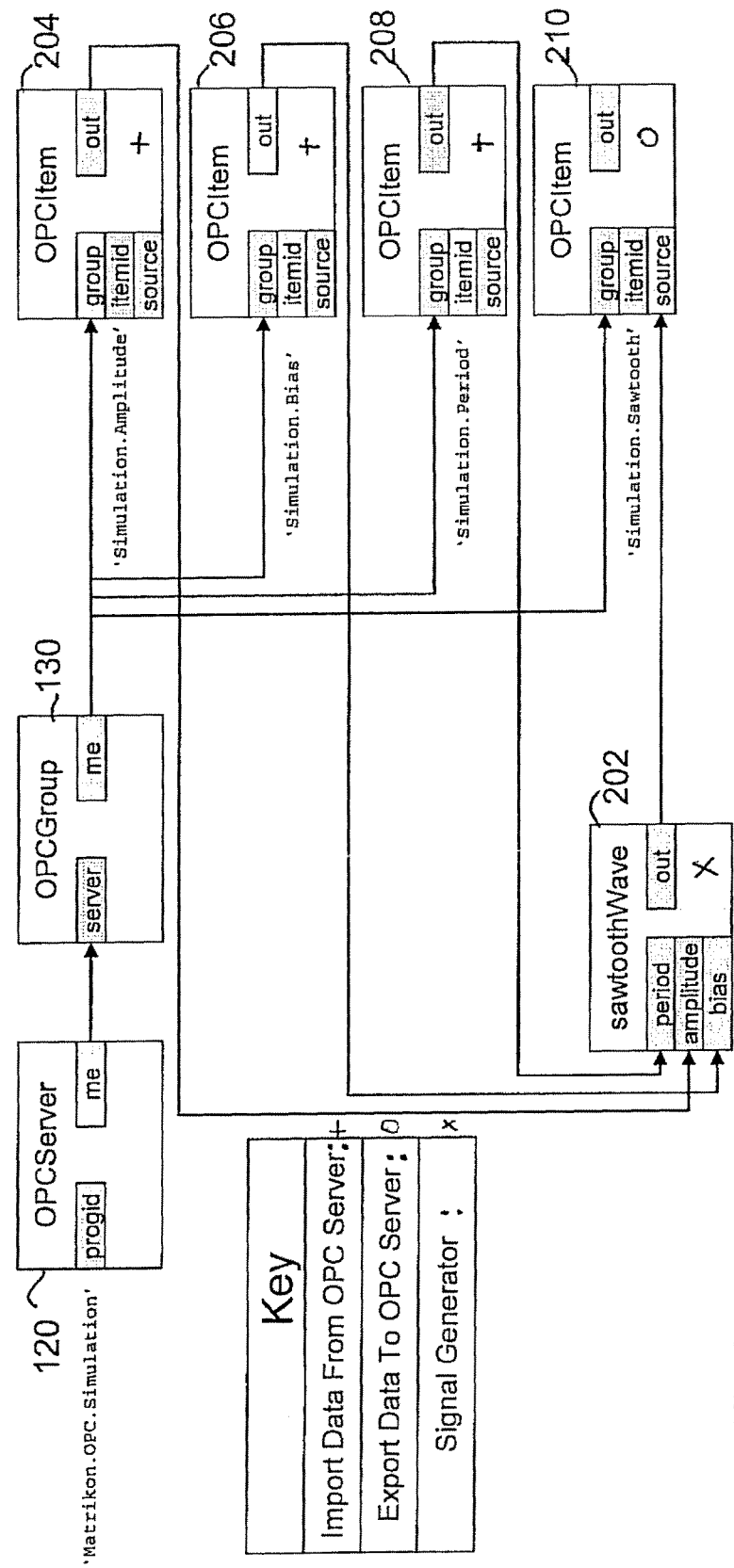
FIG. 3 is a block diagram showing an example of a simulation circuit that interfaces with an OPC server in accordance with an illustrative embodiment.

Referring to FIG. 3, a function block diagram with a simple example showing how OPC interface blocks can be used to create a simulation is illustratively shown. The simulation accepts Amplitude, Period and Bias signals as inputs from an OPC Simulation Server 120 through the OPC group (e.g., created using the code of FIG. 2). These signals are used to generate a sawtooth waveform in block 202 from OPC Items 204-210 and then subsequently write the calculated waveform values back out to the OPC simulation server 120. FIG. 4 shows the logic of FIG. 3 implemented in JavaScript™.

Building Simulation Logic: The automatic test system (100) provides the automatic generation of the test fixtures. Since controller simulations (102, FIG. 1) are one important element of the test fixtures, this gives rise to an implied requirement for automatic creation of controller simulation logic. This automatic generation of simulation logic 102 (FIG. 1) is accomplished using several components that work together. These components have a number of possible uses that are completely outside the realm of automated alarm testing.

Figure 6:
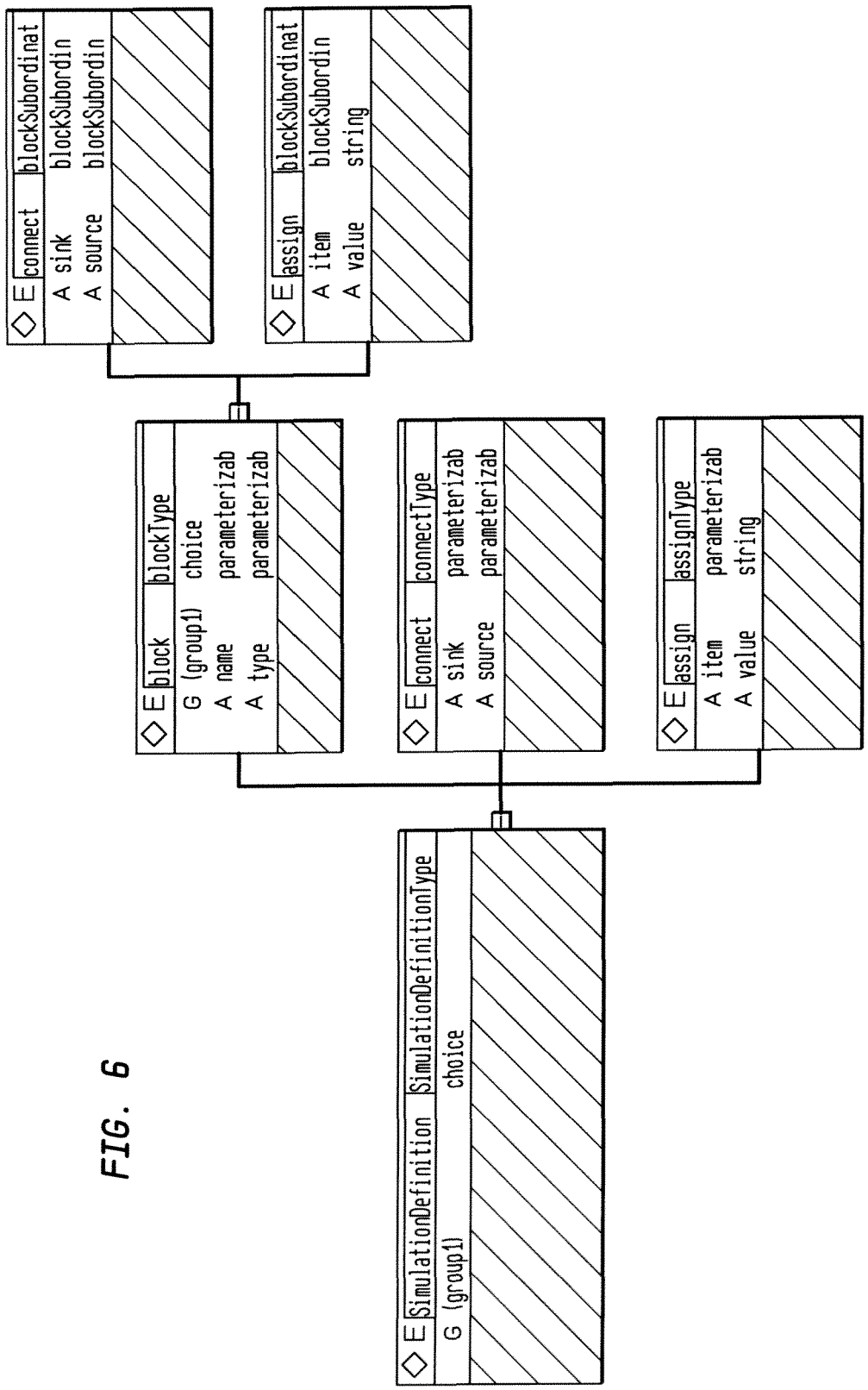
FIG. 6 is a designer view of simulation definition XML syntax in accordance with an illustrative embodiment.

A first element of the automatic simulation builder is an XML syntax that is used to specify the simulation logic 102. This Simulation Definition XML has a close correspondence to the JavaScript™ statements that are ultimately used to define a simulation. For example, the simulation logic shown in FIG. 4 can be expressed using the XML in FIG. 5. A graphic view of the XML schema for this basic Simulation Definition syntax is shown in FIG. 6.

The Simulation Definition XML is not tied in any way to the underlying JavaScript™ implementation of the simulation. Rather, the close correlation between the XML and the corresponding JavaScript™ arises from the fact that the relevant JavaScript™ classes in our simulator were designed to be "function-block-like". This means that our Simulation Definition syntax is "function block" oriented rather than "JavaScript" oriented and as a result it is suited to describing function blocks in an S7 controller, an APACS (a process control system) controller or any other target system that uses the concept of "programming by interconnecting function blocks". This means that the present system can generate code for a variety of targets.

Application Station Object (ASO) refers to an instance of an object in a controller (application station (AS)). The term is equivalent to the more widely used term "function block". In the present embodiments, an ASO is presumed to represent at least one tag in a process control system. In most cases ASOs represent a structure that includes several tags. ASOs may generate events as well. In the present context, the term ASO may denote an object in a process controller, its representation in a Database Automation (DBA) migration tool or its representation as tags in an OPC server. In most cases, it is unimportant to distinguish whether an "ASO" refers to an actual object in a controller or one of its various representations elsewhere in the system. In the present embodiments, Database Automation (DBA) refers to an engineering tool to migrate legacy process control systems to a current system (e.g., PCS 7/OS).

Function block primitives described with respect to FIGS. 2 and 3 are useful for implementing simulation logic, but they do not provide any features that can lend themselves to automating the process of creating meaningful test fixtures. For this, we need a way to define reusable simulation components, a concise way to define varying instances of these components, a way to describe bindings between entities in the simulation and the (structured) OPC tags that we will ultimately serve up to WinCC in lieu of real controller tags. These requirements are best illustrated using an example. Suppose that we are testing an APACS system. Within the APACS system, there are several Application Station Object (ASO) types that have the following characteristics 1) They accept an analog signal that corresponds to a process variable. 2) They compute four alarms based on the value of this analog signal.

In our APACS test configurations, ANALOG_ALARM_AFB, SINGLE_LP_SS_AFB and EXT_SET_AFB types all have these basic characteristics. This suggests that any ANALOG_ALARM_AFB, SINGLE_LP_SS_AFB or EXT_SET_AFB instances can be mapped to the same simulation component type, which we call an ANALOG_SIGNAL_WITH_ALARMS. Assume that we want to create some reasonable set of varying ANALOG_SIGNAL_WITH_ALARMS instances, e.g., 20 or so, and we would like to distribute the signals generated by this handful of ANALOG_SIGNAL_WITH_ALARMS instances among the hundreds of relevant points owned by the ANALOG_ALARM_AFB, SINGLE_LP_SS_AFB and EXT_SET_AFB Instances in a test DBA project. We address these requirements by adding several abstraction mechanisms to the basic Simulation Definition XML syntax.

Defining Simulation Components (<SimulationComponent> tag): To build functional units that comprise a simulation, it is useful to assemble the primitive simulation blocks described above into larger, "virtual" blocks called "simulation components". A simulation component is defined by enclosing appropriate simulation logic statements within a "SimulationComponent" element. The syntax for defining a simulation component is an extension of the basic Simulation Definition syntax of FIG. 5. This augmented syntax includes different types of entries, for example: 1) elements that are based on the XML syntax described in FIG. 5. Note that these basic simulation statements are "enhanced" in the sense that they may be parameterized. 2) Various XML elements that implement the various abstraction mechanisms used in our system. These elements are described in detail below.

The abstraction mechanisms that are used within Simulation Components have a few specific forms. There is a syntax for parameterizing Simulation Components, a syntax for generating sets of Simulation Component instances and a syntax for describing DBA mapping "hooks". The process for actually using the hooks to bind simulation components to ASO instances within our DBA is also described below.

Regular Object Tree Type: A Regular Object Tree Type is a tree whose structure can be described in terms of regular expressions. For example, we can define an XML sub-tree using DTD syntax as follows:
<!ELEMENT ContactInfo(name,(email|phone|note)*)>
which has the interpretation "a ContactInfo element has a "name" element followed by any number of email, phone and note elements, in any order. This notation describes a potentially infinite number of possible "ContactInfo" sub-trees in terms of the abstract structure which they obey. Most XML documents can be described in terms of regular object tree types, and all practical XML schema languages use regular object tree types as their basis.

Parametric Regular Object Tree Type: A regular object tree type has an ultimate form and values that depend on parameters that are fed into a parameterized regular object tree definition. In the present discussion, parameters are named items and their values are substituted wherever the parameter name occurs between "$" symbols. For example, the statement:
<connectsink=".signal"
source="$signalType$_LimitsBand$_Comparator.low"/>
will expand to:
<connect sink=.signal" source="sine_30_Comparator.low"/>
when the parameter SignalType has the value "sine" and the parameter LimitsBand has the value 30. By combining comprehensions with parametric regular object tree types, we can use very simple, compact notation to generate richly structured trees that have precise, traceable properties.

Parameterizing a Simulation Component: Simulation Components generally have several "parameter" definitions. A parameter's job is to bind a name to a value, and they can be thought of as serving a role that is similar to that of a variable in most familiar programming languages. Note that parameters generally hold strings that are ultimately intended to represent sets. When we compile a simulation definition, a parameter's values are substituted wherever its name appears between "$" symbols. For example, the statement:
binds the declaration "['sawtooth', 'triangle', 'cosine', 'sine']" to the parameter "Signals". Thus, a subsequent statement like:
<for name=SignalType" set="$Signal$">
will expand to:
<for name="SignalType" set=['sawtooth', 'triangle', 'cosine', 'sine']"/>
With the result that the "SignalType" "for" statement will assume the values 'sawtooth', 'triangle', 'cosine' and 'sine' in succession. An important characteristic of parameter statements is that their declared values can be overridden. For example, assume that we have the following Simulation Component definition:

```
<StimulationComponent name= "AnalogSignal_Alarms">
<!-These params provide default names for the mapping points-- >
    <parameter name = "pv"            set="'pv'"/>
    <parameter name="highHigh"        set="'highHigh'"/>
    <parameter name="high"            set="'high'"/>
    <parameter name="low"             set="'low'"/>
    <parameter name= "lowLOW"         set=κ'lowLow'"/>
    <parameter name= "const_0"        set="'const_0'"/>
    <parameter name= "const_100"      set="'const_100'"/>
    ...etc...
</SimulationComponent>
```

We can use this Simulation Component as part of the structure of some other Simulation Component while overriding at least one of its parameters, e.g.:

```
<SimulationComponent name =
"AnalogSignal_and_Alarms_with_Renaming">
    <use-SimulationComponent name ="AnalogSignal_and_Alarms">
        <with-parameter name= "pv" set="new_value_for_pv"/>
```

-continued

```
</use-SimulationComponent>
</SimulationComponent>
```

In this example, we have overridden the "AnalogSignal_and_Alarms" "pv" parameter value from "pv" to "new_value_for_pv". This would cause "AnalogSignal_and_Alarms_with_Renaming" instances to be formed by using the "AnalogSignal_and_Alarms" declaration and substituting the value "new_value_for_pv" wherever we encounter "$pv$".

Simulation Component Sets (the <for/> element): Since simulation components are re-usable, we would like a method to easily-generate simulation component instances. In most cases, we can describe the needed instances in terms of "sets", where the sets are defined in terms of variations in the construction of the simulation components. Ideally, simulation component sets should be related to test objectives. For example, a simulation component set might be related to some coverage requirements. The following example attempts to illustrate the basic idea.

Assume that we want four signals ("sawtooth", "triangle", "sine", "cosine") and assume that we want to generate alarms based on the amplitude of these four signals. The alarms can be implemented using comparators that have five 'bracket' levels, with each respective bracket being separated by 5 (i.e., one set of comparators has alarms at low-low=30, low=40, high=60 and high-high=70, another set has alarms at low-low=25, low=35, high=65 and high-high=75, etc. up to a final set that has alarms at low-low=10, low=20, high=80 and high-high=90). Since the signals generally have different values at any give time, each signal needs its own set of comparators (i.e., the comparators can be thought of as being subordinate to the four signal generators). This whole set would then describe 20 "ANALOG_SIGNAL_WITH_ALARMS" instances. Note that we only need four signal generators since their signals can be shared between each of five "ANALOG_SIGNAL_WITH_ALARMS" instances. Sets are generated using the "<for/>" element.

FIG. 7 shows the relevant syntax for defining the sets in the ANALOG_SIGNAL_WITH_ALARMS example. The main point of using "for" elements to describe sets of Simulation Component instances is that any item that appears within a variable declaration can be parameterized in terms of the enclosing "for" variable. For example, the statement:
<block name="$signalType$" type="$SignalType$Wave">
appears within the declaration
<for name="SignalType" set=['sawtooth', 'triangle', 'cosine', 'sine']",>
and will result in the creation of four simulation blocks; one named "sawtooth" of type "sawtoothWave", one named "triangle of type "triangleWave", one named "cosine" of type "cosineWave" and one named "sine" of type "sineWave". Similarly, the statement:
<block
  name="$SignalType$_$LimitsBand$_Comparator"type="Comparator">
is enclosed by declaration
<for name="SignalType" set="['sawtooth', 'triangle', 'cosine', 'sine,']">
and the declaration
<for name="LimtsBand" set="iterate('10 to 30 by 5')">
Therefore, it will assume 20 different values (four SignalType values*five LimitsBand values), resulting in the creation of twenty Comparator blocks, the first being named "sawtooth_10_Comparator" and the last being named "sine_30_comparator".

It is worth noting that the "for" sets are implemented using JavaScript™ arrays. Therefore, the statement:
<for name="LimitsBand" set="iterate('10 to 30 by 5')">
actually means "pass the string '10 to 30 by 5' to the iterate function and assign the Array instance that is returned to the LimitsBand variable". This process of "generating sets based on a descriptive formula" is sometimes called "comprehension". The use of set comprehensions is theoretically significant because the sets are immutable (once generated, they do not change). The practical significance of implementing the comprehensions in JavaScript™ is that it permits us to add new comprehension types if needed, and also permits us to use JavaScript's built-in JSON syntax to describe sets. As an example of how JSON is applied, consider the expression" ['sawtooth', 'triangle', 'cosine', 'sine']".

Simulation Component Mapping: A goal of our simulation is to impersonate "live" tags that would ostensibly be in real process controllers defined in our DBA test project(s). For this reason, we need a means to relate items in the simulation to items in the DBA project. Although it is possible to do a mapping directly, it may be impractical because there may be thousands of items to map and we do not necessarily know the content of the DBA project (for example, the DBA project may change over time). This role of building abstract hooks between Simulation Components and DBA ASOs is handled by "map" elements.

Map elements are used to define virtual interconnection points for our Simulation Component. For example, the XML snippet:

```
<SimulationComponent name="Analog_Signal_and_Alarms">
<!-These params provide default names for the mapping points -->
<parameter name="pv" set="pv"/>
<parameter name="highHigh" set="highHigh"/>
<!-These params provide default set definitions for the two "for" loops
that generate instances -->
<parameter name="SignalType" set+"['sawtooth', 'triangle', 'cosine',
'sine']"/>
<parameter name="LimitsBand" set="iterate('10 to 30 by 5')"/>
<for name ="SignalType" set="$SignalType$" >
<!-Declare an OPC fan-out for each analog signal-->
<block name="$SignalType$_OPC" select="OPCFanOut">
<connect sink=".signal"source="$opcServer.me" />
<connect sink=".signal"source="$SignalType$_$LimitsBand$_
Comparator.highHigh" />
</block>
... etc ...
<for name="LimitsBand" set="$LimitsBand$">
<block name="$SignalType$_$LimitsBand$_Comparator"
select="Comparator" >
<assign item=".highHighLim" value="60+$LimitsBand$" />
<assign item=".highLim" value="50+$LimitsBand$" />
<assign item=".lowLim" value="50-$LimitsBand$" />
<assign item=".lowLowlim" value="40=$LimitsBand$" />
</block>
... etc ...
<map from="$signalType$_OPC" to="$pv$">
<!-Mapping between "pv" and any assigned members of ASO
instances -->
.addItem($$pv$$);
</map>
<!-Mapping rule between "highHigh" any assigned members of
ASO instances -->
<map from="$SignalType$_$LimitsBand$_highHigh_OPC"
to="$highHigh$">
.addItem($$highHigh$$);
</map>
... etc ...
``` declares a connection point on our "Analog_Signal_and_Alarms" simulation component that can be connected to any tags on any ASOs. Assuming that the "pv", "SignalType" and "LimitsBand" parameters have their default values, we will generate 40 "map" statements, of the form:

```
<map from="sawtooth_OPC" to="pv">
</map>
<map from="sawtooth_10_highHigh_OPC" to="highHigh">
    .addItem($highHigh$);
</map>
<map from="sawtooth_OPC" to="pv">
    .addItem($pv$);
</map>
<map from="sawtooth_15_highHigh_OPC" to="highHigh">
    .addItem($highHigh$);
</map>
... etc ...
<map from="sine_OPC" to="pv">
    .addItem($pv$);
</map>
<map from="sine_25_highHigh_OPC" to="highHigh">
    .addItem($highHigh$);
</map>
<map from='sine_OPC" to="pv">
    .addItem($pv$);
</map>
<map from="sine_30_highHigh_OPC" to="highHigh">
    .addItem($highHigh$);
</map>
```

This allows us to later generate a final binding to OPC tags by collecting the set of tags that have been mapped to "Analog_Signal_and_Alarms" "pv" and iterating over each tag in that set and while iterating (mod 20) over our <map from="sawtooth_OPC" to ="pv"> declarations. This process will effectively "fan out" our 20 pv signals to hundreds of emulated APACS points.

Parameterizing Simulation Component Mapping: Since mapping statements can be parameterized, we can consider the idea of re-using simulation components by creating a new "view" on existing instances. For example, suppose that we want to create a simulation component named "CascadeSignalAndAlarms" which is intended to be used with CASCADE_AFB ASO types. A CASCADE_AFB is essentially like two SINGLE_LP_SS_AFB ASOs, so we can create a simulation component with the "right behavior" by sticking two Analog_Signal_and_Alarms simulation components together. However, this would introduce a problem that we would have two instances of the same map. For example confusion as to whether the parameter "pv" refers to the first "AnalogSignal_and_Alarms" pv or to the second "Analogsignal_and_Alarms" pv would arise.

If we generate two different parameterizations of the "AnalogSignal_and_Alarms" components, we can re-name the mapping points and eliminate this ambiguity. For example:

```
<SimulationComponent name="CascadeSignalAndAlarms">
    <for name="primary_or_secondary"
    set="['primary', 'secondary']">
        <!--
        Bind to "AnalogSignal_and_Alarms" component
        Since this is a "use-SimulationComponent" call,
            we won't create any new instances of
            "AnalogSignal_and_Alarms",
            we're just borrowing two parameterized versions of its "map"
        -->
        <use-SimulationComponent name="AnalogSignal_and_Alarms">
        <with-parameter name="pv" set=
            "$primary_or_secondary$Pv"/>
            <with-parameter name="highHigh"set=
            "$primary_or_secondary$highHigh"/>
            <with-parameter name="high" set=
            "$primary_or_secondary$high"/>
            <with-parameter name="low"set=
            "$primary_or_secondary$low"/>
            <with-parameter name="lowLow"
            set=$primary_or_secondary$lowLow"/>
    </use-SimulationComponent>
    </for>
</SimulationComponent>
```

This example iterates over the set "['primary', 'secondary']" and applies those values to the parameter "primary_or_secondary". The value of primary_or_secondary" is in turn used to change the value of the parameters that control the map name. For example, on the first pass through the loop:
    <with-parameter name="pv" set="$primary_or_secondary$Pv"/>
becomes
    <with-parameter name="pv" set="primaryPv"/>

Thus, the value of the "pv" parameter in the first "AnalogSignal_and_Alarms" will be "primaryPv"—This causes the mapping declarations which depend on "pv" to look like:

```
<map from="sawtooth_OPC"  to="primaryPv">
    .addItem($primaryPv$);
</map>
```

As a result, we end up creating a seemingly new Simulation Component with twice as many signals and completely different names. In reality, this component is just a renamed view on existing "AnalogSignal_and_Alarms" Simulation Component instances (i.e., we are borrowing instances and re-naming their mapping points).

Instantiating Simulation Components: Simulation Components can be instantiated using the "make-SimulationComponent" statement.

For example, the statement:
This particular example instantiates "Analogsignal_and_Alarms" using the default parameters in the "AnalogSignal_and_Alarms" declaration. "make-SimulationComponent" can have "with-parameter" arguments just as is "use-SimulationComponent" can. For example, a declaration like:

```
<make-Simulationcomponent name="AnalogSignal_and_Alarms">
    <withparamater name="Signals" set=['cosine','sine']"/>
</make-SimulationComponent>
``` will result in the creation of "AnalogSignal_and_Alarms" instances whose contents are based only on "cosine" and "sine" values (i.e., we have omitted any instantiations based on "sawtooth" and "triangle").

Final Binding to ASOs: All of the signals produced by our simulation need to ultimately be related to signals that WinCC expects to see. Since these alarm signals are ultimately defined by the DBA, the set of OPC tags that are and any bindings between those tags and the simulation logic need to be a product of any defined relationships between our set of Simulation Types and any DBA content. The most economical way to create these bindings is on the basis of type information, i.e., we want to map between Simulation Types that we have defined and ASO types that have been defined in the DBA.

Figure 8:
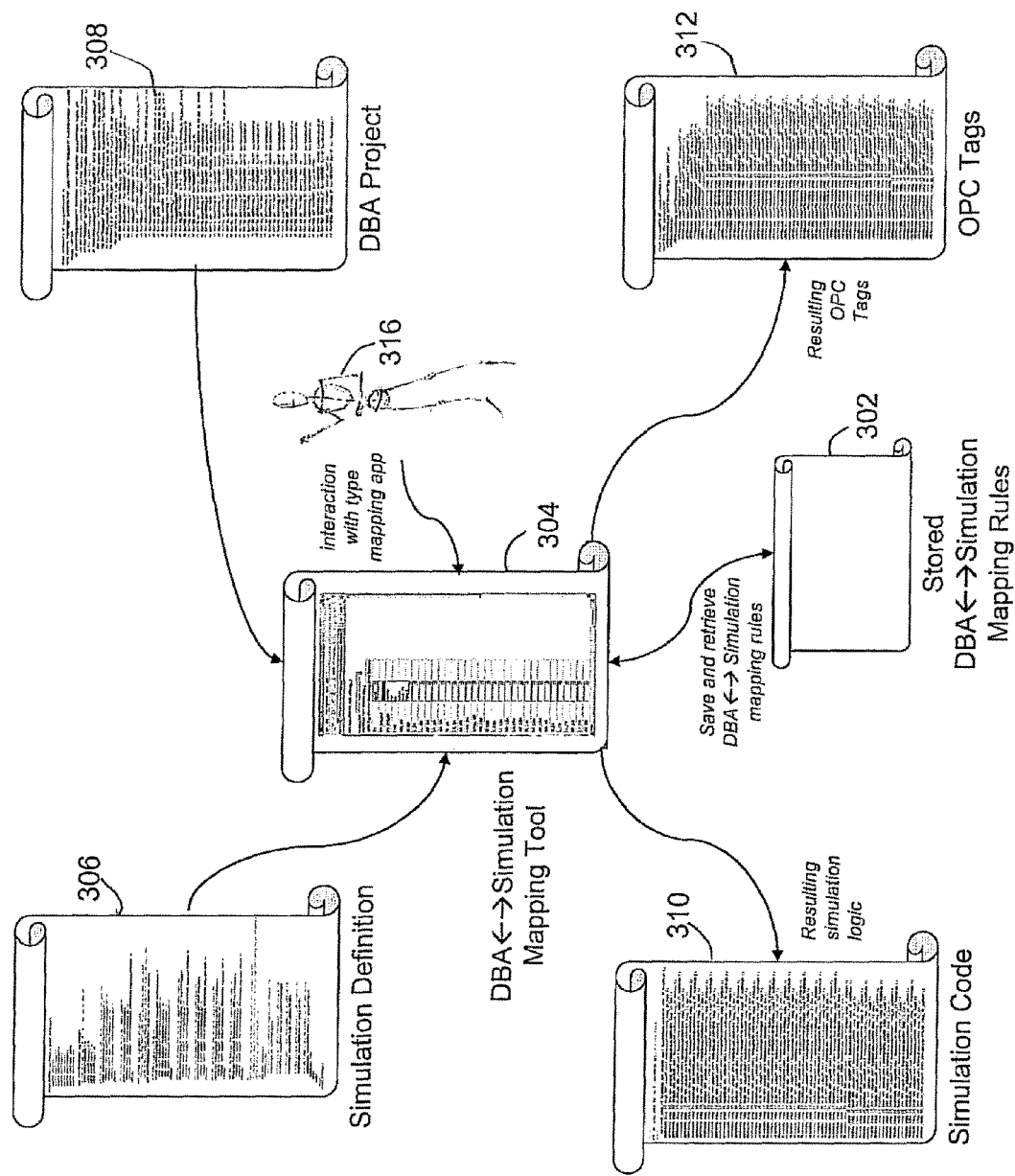
FIG. 8 is a block diagram showing a mapping tool to complete the definition of the simulation environment.

Referring to FIG. 8, an overview of the process that is used to define and apply the rules that are used to establish the Simulation to DBA binding is illustratively shown. In block 302, mapping rules (for DBA to simulation mapping) are stored and made accessible for retrieval by a DBA to simulation mapping tool 304. A simulation definition 306 and DBA project information 308 are provided and input to the mapping tool. Based on the rules, DBA specific information and simulation definitions, simulation code 310 and OPC tags 312 are generated and provided to simulate controllers for a system under test. A user 316 may be provided an interface to interact with the mapping tool to make adjustments or changes in the simulation process.

Figure 9:
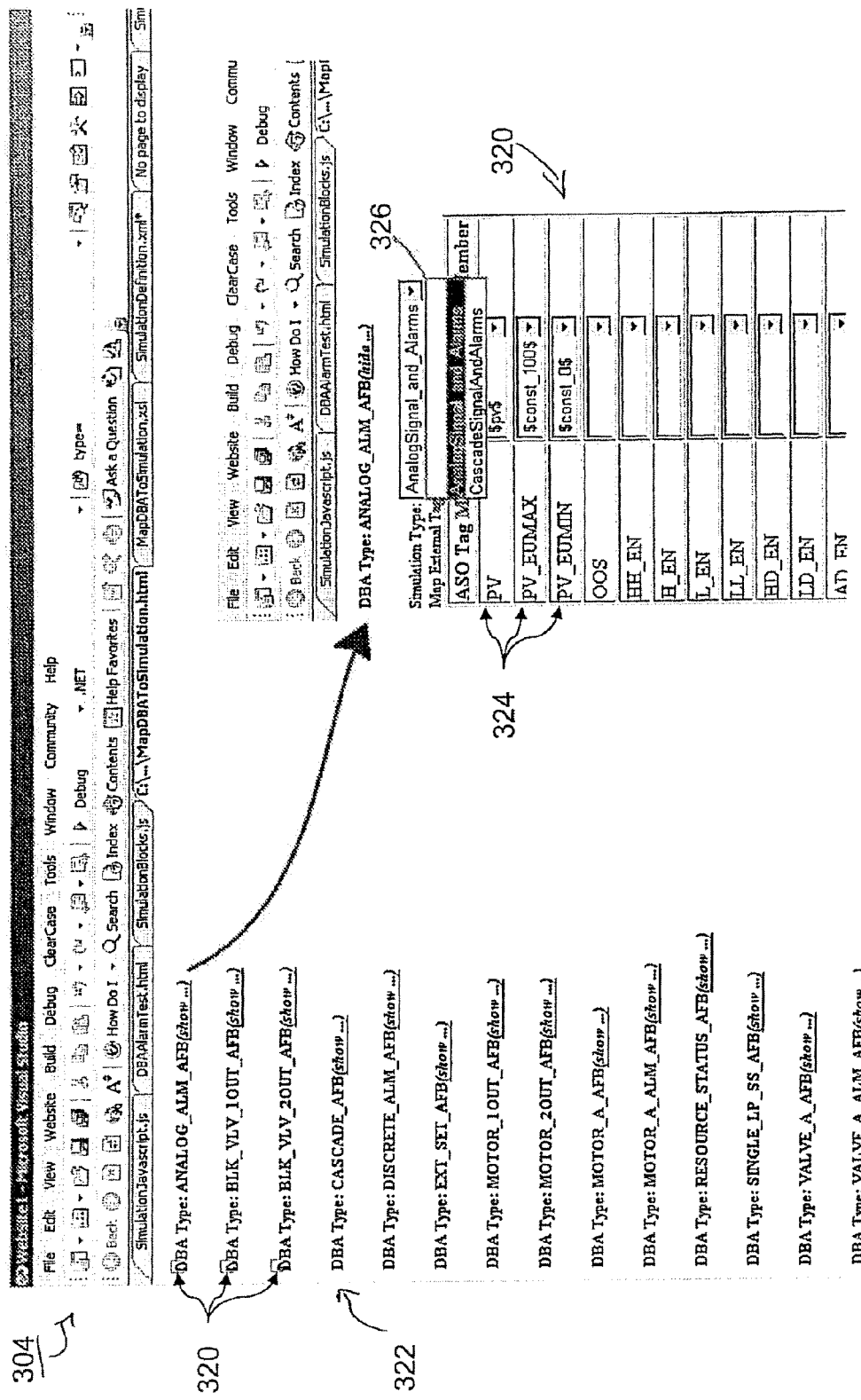
FIG. 9 is an illustrative view of a user interface employed in mapping a simulation to a target system in accordance with the present embodiments.

Referring to FIG. 9, a more detailed view of the mapping application 304 is illustratively depicted. This application is generated by transforming the XML that defines simulation logic and the XML that comprises the content of the DBA project. The application lists ASO types 320 that are available in a table 322 or the like in the DBA project. For each ASO type 320, it is possible to click on a link that reveals members 324 of that type. In addition, the ASO detail view has a drop-down list 326 of available Simulation Component types. By selecting an ASO type from the drop-down list, one assigns that Simulation Type to the ASO above it.

FIG. 9 shows the Simulation Component type: "Analog_Signal_And_Alarms" being assigned to the ASO type ANALOG_ALM_AFB/
After a Simulation Type has been bound to a particular ASO type, one can assign various members of the Simulation Component to various members of the ASO type. In addition, it is possible to store and retrieve the DBA Simulation assignments so that they can be used again in the future.
This "type to type" and "member to member" assignment information is all that the system needs to build mappings between items in the Simulation Component Instances and corresponding members in all ASO instances. As a final phase, the system compiles the information into an HTML page with JavaScript™ logic (Simulation Code 310 in FIG. 8) and a set of tag definitions (312 in FIG. 8) for the OPC server (the OPC server accepts XML tag definitions as input).

The manual work that needs to be performed is minimal. The present application automatically parses Simulation Definitions and DBA projects and creates an environment which makes it extremely easy for a user to make the necessary assignments. This provides an assistive environment, wherein the computer handles the information processing drudgery and leaves intelligent tasks (e.g., signal assignment) to people.

Figure 10:
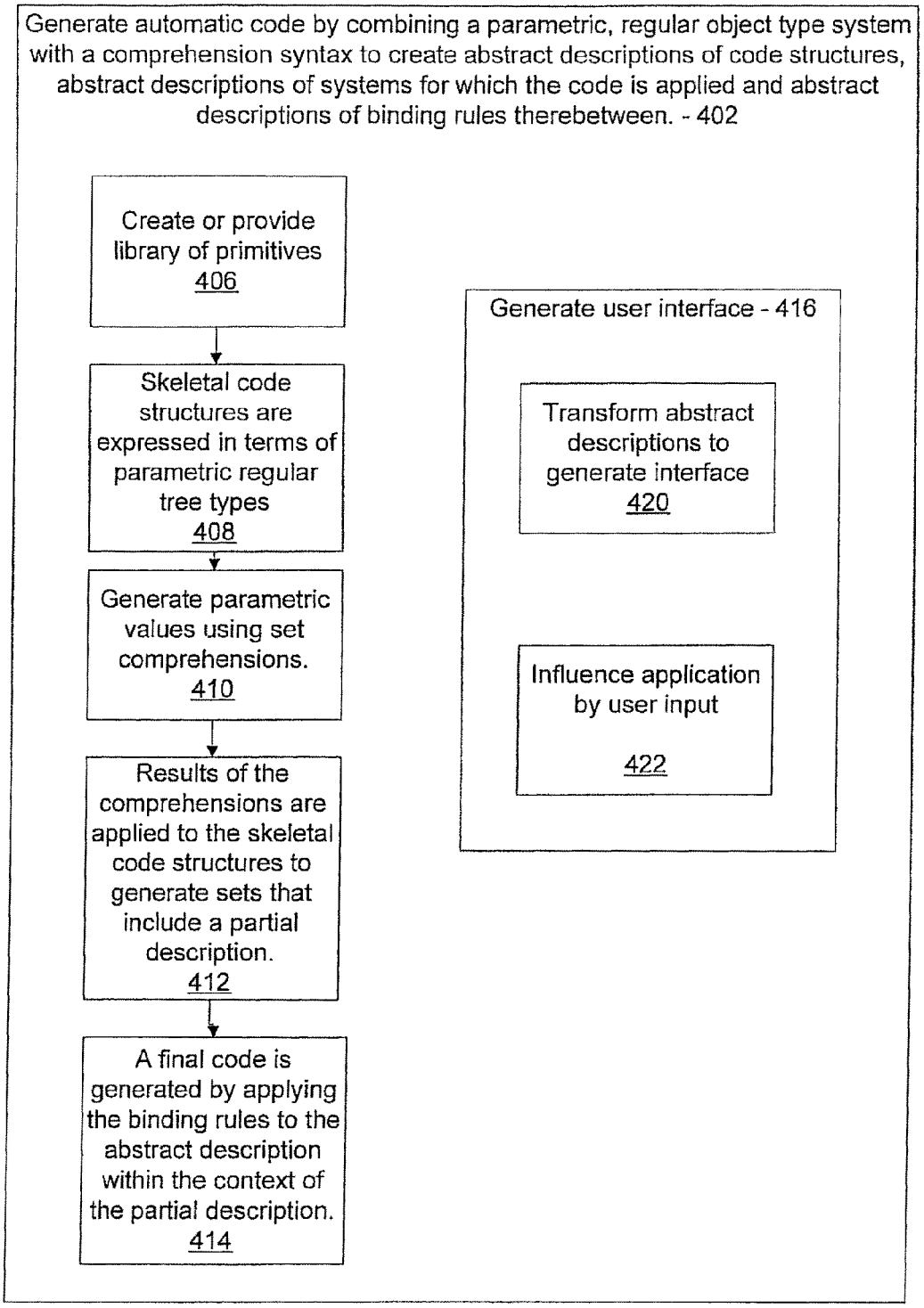
FIG. 10 is a block/flow diagram for a system/method for automatically generating automated test fixtures in accordance with the present embodiments.

Referring to FIG. 10, a block/flow diagram shows an illustrative system/method for generating automated code, e.g., test fixtures, in accordance with exemplary embodiments. The steps provided here may be performed by a processor and/or program code. In block 402, a parametric, regular object type system is combined with a comprehension syntax to create abstract descriptions of code structures, abstract descriptions of systems for which the code is applied and abstract descriptions of binding rules between the abstractions of code structures and the abstractions of systems for which the code is applied to automatically generate program code. In a particularly useful embodiment, a parametric, regular object type system is combined with a comprehension syntax to create abstract descriptions of test fixtures, abstract descriptions of systems under test and abstract descriptions of binding rules between the abstractions of test fixtures and the abstractions of systems under test to automatically generate text fixtures.

In block 406, a library of code primitives are created. This may include code that simulated test conditions or requirements or other controlling aspects of an application or test. In block 408, skeletal code structures are expressed in terms of parametric regular tree types including parameterized versions of the code primitives. In block 410, parametric values are generated using set comprehensions. In block 412, results of the comprehensions are applied to the skeletal code structures to generate resulting sets that are at least a partial description of a working text fixture. In block 414, a final test fixture (or application code) is generated by applying the abstract binding rules to the abstract descriptions of systems under test within the context of the at least partial description of a working text fixture.

In block 416, a user interface may be generated to permit a user to provide for a final binding between a target system to be tested and the at least partial description of a working test fixture. The user interface may be constructed by transforming information from the abstract description of the test fixture and from the abstract description of the system under test to generate the interface to permit user input in block 420, and influencing application of at least one of the binding rules or other directable aspects of the code generation system in block 422.

Having described preferred embodiments for parametric regular object types with comprehensions for automated generation of software test fixtures (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:
1. A method for creating abstract descriptions of general test fixture applications for interfacing with, exercising and testing one or more software applications under test separate from the general test fixture applications to verify correct operation, comprising:
    providing a software application for testing;
    creating a library of code primitives;
    expressing skeletal code structures in terms of parametric regular tree types including parameterized declarations of the code primitives;
    generating parametric values using set comprehensions; and
    applying the set comprehensions to the skeletal code structures to generate a working test fixture application for interfacing with, exercising and testing the software application that is separate from the working test fixture application, to verify correct operation such that a parametric, regular object type system is combined with a comprehension syntax for creating abstract descriptions of a general test fixture application.
2. The method of claim 1, wherein the working test fixture application is generated with direction from an interactive user.
3. The method of claim 2, wherein the direction from an interactive user is provided by an interface that is constructed by:

transforming information from the abstract description of the code to be generated to generate an interface to receive the direction; and influencing aspects of the code generation system by the user.

4. A computer readable medium comprising a computer readable program, wherein the computer readable program when executed on a computer causes the computer to perform the steps of claim 1.

5. A method for automatically generating program code implementing a test fixture application for exercising and testing a software application separate therefrom, comprising:
   combining a parametric, regular object type system with a comprehension syntax to create abstract descriptions of code structures, abstract descriptions of systems for which the code is applied and abstract descriptions of binding rules between the abstractions of code structures and the abstractions of systems for which the code is applied to automatically generate program code, by:
   creating a library of code primitives; expressing skeletal code structures in terms of parametric regular tree types including parameterized versions of the code primitives;
   generating parametric values using set comprehensions;
   applying results of the comprehensions to the skeletal code structures to generate resulting sets that are at least a partial description of a working code structure; and
   generating a final code structure for the test fixture application to interface with, exercise and verify correct operation of the software application separate therefrom by applying the abstract binding rules to the abstract descriptions of systems for which the code is applied within the context of the at least partial description of a working code structure.

6. The method of claim 5, wherein generating a final code structure includes generating a user interface to permit a user to provide for a final binding between a target system and the at least partial description of a working code structure.

7. The method of claim 6, wherein the user interface is constructed by:
   transforming information from the abstract description of the code structure and from the abstract description of the system for which the code is applied to generate the interface to permit user input; and
   influencing application of at least one of the binding rules or other directable aspects of the code generation system.

8. The method of claim 5, wherein generating a final code structure includes generating control system code for a system based on abstract descriptions of relevant control strategies, with the final code structure of the system being based on the abstract control strategies in combination with comprehensions that govern instances to be created in combination with abstract descriptions of the system that is to be controlled.

9. A computer readable medium comprising a computer readable program, wherein the computer readable program when executed on a computer causes the computer to perform the steps of claim 5.

10. A method for automatically generating automated test fixtures for testing one or more target systems separate therefrom, comprising:
    combining a parametric, regular object type system with a comprehension syntax to create abstract descriptions of test fixtures, abstract descriptions of systems under test and abstract descriptions of binding rules between the abstractions of test fixtures and the abstractions of systems under test to automatically generate text fixtures for interfacing with and verifying correct operation of the systems under test, by:
    creating a library of code primitives;
    expressing skeletal code structures in terms of parametric regular tree types including parameterized versions of the code primitives;
    generating parametric values using set comprehensions;
    applying results of the comprehensions to the skeletal code structures to generate resulting sets that are at least a partial description of a working text fixture; and
    generating a final test fixture by applying the abstract binding rules to the abstract descriptions of systems under test separate from the final test fixture within the context of the at least partial description of a working text fixture.

11. The method of claim 10, wherein generating a final test fixture includes generating a user interface to permit a user to provide input for a final binding between a target system to be tested by the final test fixture and the at least partial description of a working test fixture.

12. The method of claim 10, wherein the user interface is constructed by:
    transforming information from the abstract description of the test fixture and from the abstract description of the system under test to generate the interface to permit user input; and
    influencing application of at least one of the binding rules or other directable aspects of the code generation system.

13. A computer readable medium comprising a computer readable program, wherein the computer readable program when executed on a computer causes the computer to perform the steps of claim 10.

14. A system for creating abstract descriptions of general test fixture applications for exercising and testing one or more software applications implemented separate therefrom, comprising:
    a library of code primitives;
    skeletal code structures expressed in terms of parametric regular tree types including parameterized declarations of the code primitives; and
    a processor configured to generate parametric values using set comprehensions and apply the set comprehensions to the skeletal code structures to generate a working test fixture application for interfacing with, exercising and testing a software application separate therefrom to verify operation thereof such that a parametric, regular object type system is combined with a comprehension syntax for creating abstract descriptions of a general test fixture application.

15. The system of claim 14, wherein the working test fixture application includes automatically generated code influenced by a user.

16. The system of claim 14, wherein the general test fixture application includes a process control system and the working test fixture application include a test system.

17. The method of claim 10 further comprising applying the final test fixture to a software application to test operation thereof.

* * * * *